United States Patent
Gonze et al.

(10) Patent No.: US 8,209,970 B2
(45) Date of Patent: Jul. 3, 2012

(54) HYBRID COLD START STRATEGY USING ELECTRICALLY HEATED CATALYST

(75) Inventors: Eugene V. Gonze, Pinckney, MI (US); Frank Ament, Troy, MI (US); Halim G Santoso, Wixom, MI (US)

(73) Assignee: GM Global Technology Operations LLC

( * ) Notice: Subject to any disclaimer, the term of this patent is extended or adjusted under 35 U.S.C. 154(b) by 959 days.

(21) Appl. No.: 11/803,682

(22) Filed: May 15, 2007

(65) Prior Publication Data

US 2008/0282673 A1 Nov. 20, 2008

(51) Int. Cl.
*F01N 3/10* (2006.01)

(52) U.S. Cl. ............... 60/303; 60/274; 60/286; 60/300; 60/301

(58) Field of Classification Search ............ 60/274–273, 60/284–287
See application file for complete search history.

(56) References Cited

U.S. PATENT DOCUMENTS

| | | | | |
|---|---|---|---|---|
| 5,224,335 A * | 7/1993 | Yoshizaki | .................. | 60/300 |
| 5,319,929 A * | 6/1994 | Cornelison et al. | ............. | 60/274 |
| 5,327,991 A * | 7/1994 | Yoshida | ................... | 180/65.245 |
| 5,426,934 A * | 6/1995 | Hunt et al. | ........................ | 60/276 |
| 5,441,122 A * | 8/1995 | Yoshida | ................... | 180/65.245 |
| 5,444,976 A * | 8/1995 | Gonze et al. | ..................... | 60/274 |
| 5,785,137 A * | 7/1998 | Reuyl | ....................... | 180/65.245 |
| 5,806,307 A * | 9/1998 | Aoki et al. | ........................ | 60/277 |
| 5,848,530 A * | 12/1998 | Matsuoka et al. | .............. | 60/277 |
| 5,904,902 A * | 5/1999 | Matuoka et al. | .............. | 422/174 |
| 5,950,419 A * | 9/1999 | Nishimura et al. | .............. | 60/274 |
| 5,966,931 A * | 10/1999 | Yoshizaki et al. | .............. | 60/284 |
| 6,151,890 A * | 11/2000 | Hoshi | .............. | 60/297 |
| 6,253,866 B1 * | 7/2001 | Kojima | .................... | 180/65.235 |
| 6,810,977 B2 * | 11/2004 | Suzuki | ........................ | 180/65.25 |
| 6,892,541 B2 * | 5/2005 | Suzuki | ........................ | 60/706 |
| 6,931,839 B2 * | 8/2005 | Foster | .............. | 60/284 |
| 7,077,224 B2 * | 7/2006 | Tomatsuri et al. | ........ | 180/65.235 |
| 7,213,665 B2 * | 5/2007 | Yamaguchi et al. | ........ | 180/65.27 |
| 2001/0032621 A1* | 10/2001 | Kojima et al. | ................ | 123/492 |
| 2007/0062189 A1* | 3/2007 | Keppeler et al. | ............. | 60/605.1 |

* cited by examiner

*Primary Examiner* — Thomas Denion
*Assistant Examiner* — Jesse Bogue

(57) ABSTRACT

A method of operating an engine control system includes generating an engine start signal, determining whether a cold start condition exists, energizing an electrically heated catalyst based on the cold start condition, determining the temperature of the electrically heated catalyst and selectively starting an engine based on the engine start signal and the electrically heated catalyst temperature.

17 Claims, 4 Drawing Sheets

HYBRID COLD START STRATEGY USING ELECTRICALLY HEATED CATALYST

FIELD

The present disclosure relates to improved emissions control, and more particularly to a system and method for starting an internal combustion engine in a hybrid vehicle.

BACKGROUND

The statements in this section merely provide background information related to the present disclosure and may not constitute prior art.

A hybrid vehicle includes an internal combustion engine and an electric motor to provide vehicle propulsion. Hybrid vehicles include series hybrids and parallel hybrids. In series hybrids, an engine is provided to run a generator that produces power for vehicle propulsion. In parallel hybrids, the electric motor and engine may propel the vehicle individually, or together; with the engine additionally charging the power source (batteries) for the motor.

Hybrid vehicles tend to improve fuel economy and reduce vehicle emissions by using only the electric motor while the vehicle is idling or moving at low speeds. Hybrid vehicles may carry a smaller engine than typical vehicles and may be configured to run the engine when the electric motor's rechargeable battery charge falls below a predetermined level or when the hybrid vehicle needs the additional horsepower. Typical conditions requiring the additional horsepower may include rapid acceleration and high load demands on the electric motor and vehicle. Such operation of the vehicle may result in the engine frequently starting and stopping.

To reduce emissions, engines control the amount of fuel that is burned. Engine control systems control an air-fuel ratio with a goal of reaching an optimum stoichiometric ratio. At optimum stoichiometric ratio, all of the fuel is burned using all of the oxygen in the air.

Most modern vehicles are equipped with three-way catalytic converters. "Three-way" refers to the three emissions that catalytic converters help to reduce—carbon monoxide, volatile organic compounds (VOCs) and NOx. The catalytic converter uses two different types of catalysts, a reduction catalyst and an oxidation catalyst. Both types include a ceramic structure that is coated with a metal catalyst, usually platinum, rhodium and/or palladium. The catalytic converter exposes the catalyst to the exhaust stream while minimizing the amount of catalyst that is required due to the high cost of the catalyst materials.

There are two main types of structures that are used in catalytic converters—honeycomb and ceramic beads. The reduction catalyst is the first stage of the catalytic converter that typically uses platinum and rhodium to help reduce the NOx emissions. When the NOx molecules contact the catalyst, the catalyst separates the nitrogen from the molecule, holds on to the nitrogen and frees the oxygen in the form of Ox. The nitrogen bond with other nitrogen that are also held by the catalyst, forming $N_2$. For example:

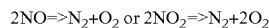

The oxidation catalyst is the second stage of the catalytic converter that reduces the unburned hydrocarbons and carbon monoxide by burning (oxidizing) them over a platinum and palladium catalyst. The oxidation catalyst reacts the CO and hydrocarbons with the remaining oxygen in the exhaust gas. For example:

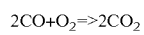

The third stage is a control system that monitors the exhaust stream and uses the information to control the fuel injection system. Typically an oxygen sensor is mounted between the engine and the catalytic converter. The oxygen sensor senses oxygen in the exhaust. An engine control system increases or decreases the amount of oxygen in the exhaust by adjusting the air-fuel ratio. The engine control system makes sure that the engine is running at close to the optimum stoichiometric ratio and that there is enough oxygen in the exhaust to allow the oxidization catalyst to burn the unburned hydrocarbons and CO.

The catalytic converter only works at a fairly high temperature. When the engine is first started, the catalytic converter is not effective in removing emissions in the exhaust until the catalytic converter reaches an operating temperature called the light-off temperature. "Light-off temperature" is the point where the conversion of CO or HC has reached 50% efficiency. Starting an engine with a catalytic converter that needs to be warmed up to the light-off temperature, or cold-starting, may be a repetitive act particularly seen in hybrid vehicles that repeatedly start, stop and restart the engine during normal operation.

One conventional solution to engine cold-starting is to move the catalytic converter closer to the engine. Hotter exhaust gas reaches the catalytic converter and heats it up faster. This approach tends to reduce the life of the catalytic converter by exposing it to extremely high temperatures. Typically, the catalytic converter is positioned under the front passenger seat; far enough from the engine to keep the temperature down to levels that will not harm it.

Preheating or supplementally heating the catalytic converter is another conventional way to reduce the time required for the catalytic converter to reach the light-off temperature. The easiest way to heat the converter is to use electric resistance heaters, such as found in heating elements. These "external" heaters are placed upstream from the catalytic converter, supplementally heating the passing exhaust gases that enter the converter. The heating element may contain catalytic material. Once the catalyst associated with the heating element reaches light-off temperature, engine exhaust gas will oxidize while passing over the heating element catalyst. This oxidation releases additional heat into the exhaust gas, rapidly elevating the catalytic converter temperature to light-off as well.

The 12-volt electrical systems on most vehicles will not provide enough energy to pre-heat the heating element fast enough. The driver may have to wait several minutes for the heating element to be pre-heated before starting the vehicle. Without preheating, exhaust gas flowing past the heating element will cool the catalyst associated with the heating element and increase the amount of time needed to reach to light-off temperature.

SUMMARY

A method of operating an engine control system includes generating an engine start signal, determining whether a cold start condition exists, energizing an electrically heated catalyst based on the cold start condition, determining the temperature of the electrically heated catalyst and selectively starting an engine based on the engine start signal and the electrically heated catalyst temperature.

Furthermore, the present disclosure relates to an engine control system including a cold start determination module to determine an engine condition. An EHC control module selectively energizes an electrically heated catalyst. An EHC temperature module determines a temperature of the electrically heated catalyst. An engine actuation module is operable to selectively start an engine based on the cold start determination and the electrically heated catalyst temperature.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
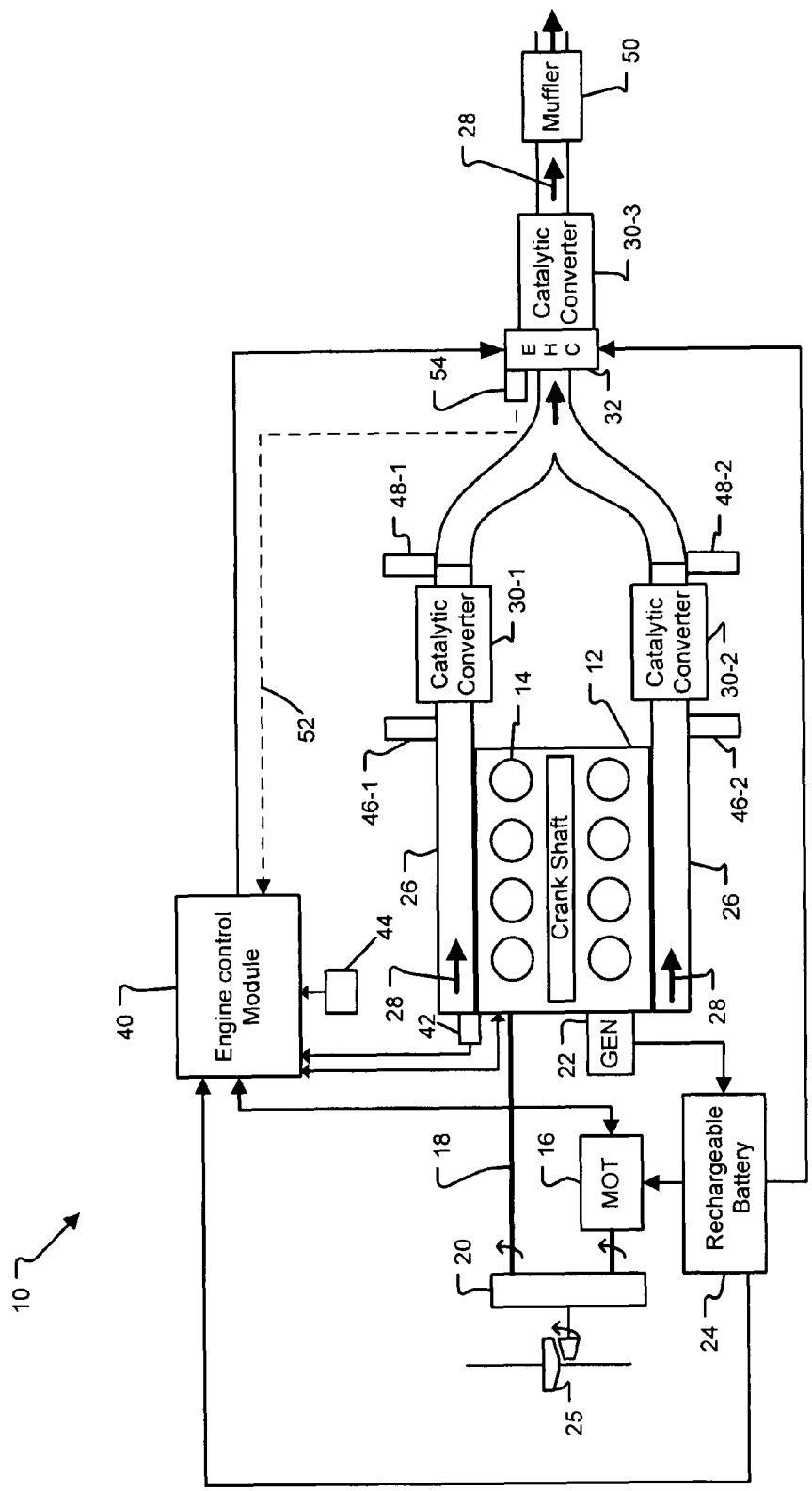
FIG. 1 is a schematic of a hybrid vehicle engine control system that includes a plurality of catalytic converters an electrically heated catalyst.

The following description is merely exemplary in nature and is not intended to limit the present disclosure, application, or uses. For purposes of clarity, the same reference numbers will be used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, a hybrid vehicle 10 includes an engine 12 with a plurality of cylinders 14 and an electric motor 16. The engine 12 is connected to an output shaft 18 that provides rotational power to a transmission 20. A generator 22 is driven by the engine 12 and provides charging current to a rechargeable battery 24. The motor 16 converts power from the battery 24 to mechanical power. The mechanical power is applied to an input shaft of the transmission 20. The transmission 20 combines power from the engine 12 and motor 16 to provide power to a drive axle 25. The engine 12 and motor 16 may provide propulsion simultaneously or independently.

The engine 12 is also connected to an exhaust manifold 26. The exhaust manifold 26 directs exhaust gas 28 from the engine 12 to a plurality of catalytic converters 30-1, 30-2, 30-3, collectively 30. The plurality of catalytic converters 30 may be three-way catalytic converters. Catalytic converters 30-1, 30-2 may be close-mounted to the engine to promote their efficient heating to light-off.

The catalytic converter 30-3 is associated with a heating element 32, such as an electrically heated catalyst (EHC) 32 providing supplemental heat to the catalytic converter 30-3. The supplemental heating provides for a reduced time to catalytic converter 30-3 light-off. As can be appreciated, the EHC 32 may be a separate assembly or formed integrally as part of the catalytic converter 30-3. The EHC 32 may be powered by the rechargeable battery 24. The catalytic converter 30-3 and EHC 32 may be an integrated "add-on" to an existing exhaust system architecture.

The hybrid vehicle 10 may be a plug-in hybrid. "Plug-in" refers to hybrid vehicles that include a relatively large rechargeable battery 24 providing an extended time between battery 24 recharges. The result is a corresponding savings in fuel and a reduction in emissions by allowing the engine 12 to be shut off for longer periods of time. The plug-in hybrid battery 24 may also be externally recharged between trips, providing a recharge of the battery 24 without running the engine 12.

An engine control module 40 communicates with the EHC 32, the engine 12, the motor 16, the battery 24 and receives inputs from a number of sensors. The sensors may include an engine coolant temperature sensor 42, and ambient temperature sensor 44 as well as a plurality of oxygen sensors 46-1, 46-2, collectively 46, located between the engine 12 and the catalytic converters 30-1, 30-2. The oxygen sensors 46 sense oxygen content in the exhaust gas to properly adjust the air-fuel ratio for proper stoichiometry. As can be appreciated, the oxygen sensors 46 may be located in other positions or omitted. For example, other oxygen sensors 48-1, 48-2, collectively 48, provide diagnostic information relating to catalytic converters 30-1, 30-2 and may be located downstream from the plurality of catalytic converters 30-1, 30-2. A muffler 50 is located downstream from the catalytic converter 30-3.

A signal 52 indicating the temperature of EHC 32 is also provided to engine control module 40. The temperature of EHC 32 may be directly measured via a sensor 54 or the engine control module 40 may estimate the EHC temperature. Various data, including current passing through EHC 32, the voltage supplied to EHC 32, the volume flow rate of gas 28 passing through EHC 32 and the time elapsed for each of these parameters may be provided to engine control module 40 to estimate the temperature.

As will be described more fully below, before the engine 12 may be started, the engine control module 40 determines whether the catalytic converter 30-3 requires supplemental heating. If the engine coolant temperature is above a predetermined temperature, a cold-start situation does not exist and the engine 12 may be started without energizing EHC 32. If a cold-start condition is detected, the engine control module 40 will activate the EHC 32 and delay starting the engine 12 until the EHC 32 heats to a predetermined temperature. The predetermined temperature value may be set to a temperature where emission reduction efficiency reaches a desired efficiency, although other set points and/or percentages may be used. This temperature may be referred to as the EHC light-off temperature.

Prior to starting engine 12, the EHC 32 may reach the light-off temperature within 5-120 seconds. However, EHC 32 will likely remain energized for some period of time after engine start due to the cooling that occurs once the exhaust gas begins to pass through EHC 32 and catalytic converter 30-3. More particularly, the EHC 32 remains energized until the catalytic converter 30-3 itself may be maintained at a predetermined temperature without supplemental energy being provided by EHC 32.

Engine control module 40 may evaluate data including the ambient air temperature, the engine coolant temperature, the exhaust gas flow, and the power provided to EHC 32 to estimate the time EHC 32 should be energized after engine start. Engine control module 40 may consider other information including air-fuel ratio and spark retardation data to estimate the temperature of the catalyst within the catalytic converter 30-3. This estimation is used to determine if the temperature of catalytic converter 30-3 may be maintained above a predetermined temperature after EHC 32 is deactivated.

Under typical operating conditions, the engine control module 40 will keep the engine 12 turned off while the EHC 32 heats up to the target temperature. Once the EHC 32 reaches temperature, the engine 12 will be started and power will continue to be supplied to the EHC 32 until engine control module 40 determines that a temperature equal to or greater than a predetermined temperature will be maintained with catalytic converter 30-3 after EHC 32 is shut off. At this time, the EHC 32 may be deactivated.

The period of time that the EHC 32 remains energized after engine start may be minimized by implementing optional engine control methods. The methods described below need not occur but may provide further techniques for reducing the energization time of EHC 32. One method of reducing the time that EHC 32 is energized includes setting the air-fuel ratio at or lean of stoichiometry. Engine exhaust gas products combine with the remaining oxygen present in the air-fuel mix and oxidize when passing the EHC 32. This exothermic reaction releases additional heat into the exhaust gas 28 and rapidly heats the catalytic converter 30-3. The additional heat produced with the oxidation of exhaust gas 28 increases to a level greater than the level of heat released by the EHC 32 alone. Accordingly, the EHC 32 may be deactivated shortly after engine start due to the rapid heating of the catalytic converter 30-3 itself.

An additional method of reducing the energization time of EHC 32 includes retarding the ignition timing. For example, the ignition timing may be set after top-dead-center to provide an increase in exhaust gas 28 temperature.

Under certain conditions, such as when battery 24 requires recharging or hybrid vehicle 10 requires maximum horsepower, engine 12 may be started prior to energization of the EHC 32. Should engine 12 be started while the catalytic converter 30-3 is below the target operating temperature, the EHC 32 may be activated after the engine has been started to reduce the time required for the catalytic converter 30-3 to reach the target temperature. The various engine operating strategies previously described may also be used to further reduce the time required for EHC 32 energization.

Figure 2:
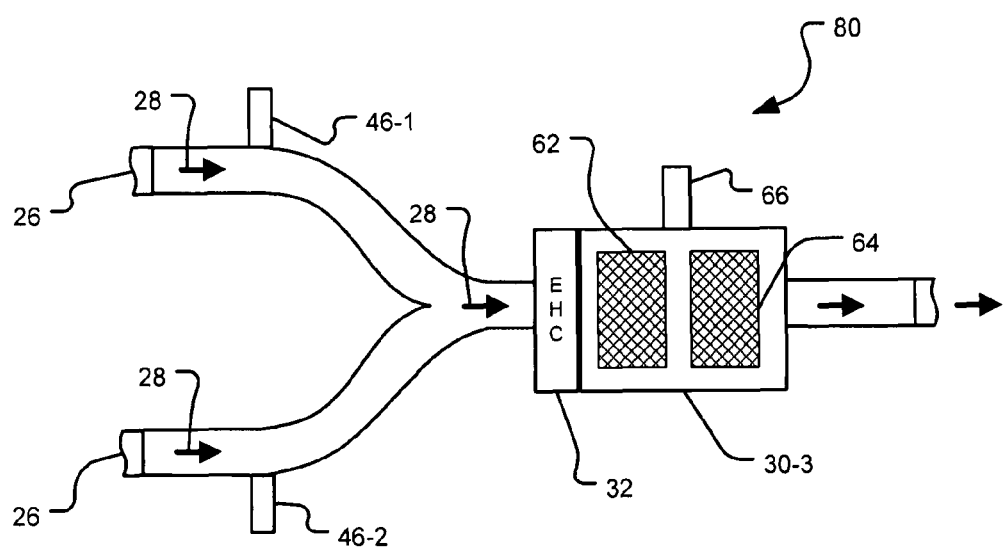
FIG. 2 is a schematic of a hybrid vehicle engine control system that includes a single catalytic converter and an electrically heated catalyst according to the present disclosure.

Referring now to FIG. 2, a hybrid vehicle 80 is depicted in part, and includes a single catalytic converter 30-3. Compared to vehicle 10, the plurality of close-mounted catalytic converters 30-1, 30-2 are removed. The catalytic converter 30-3 may include the EHC 32, or the EHC 32 may be located upstream from the catalytic converter 30-3. Oxygen sensors 46 are positioned between the exhaust manifold 26 and the catalytic converter 30-3. Catalytic converter 30-3 may include an upstream catalyst 62 and a downstream catalyst 64 positioned within a common housing. Another oxygen sensor 66 may be positioned within the catalytic converter 30-3 between the upstream catalyst 62 and the downstream catalyst 64. The oxygen sensor 66 may be used by the engine control module 40 to monitor and adjust operation of the EHC 32 and catalytic converter unit 30-3.

Figure 3:
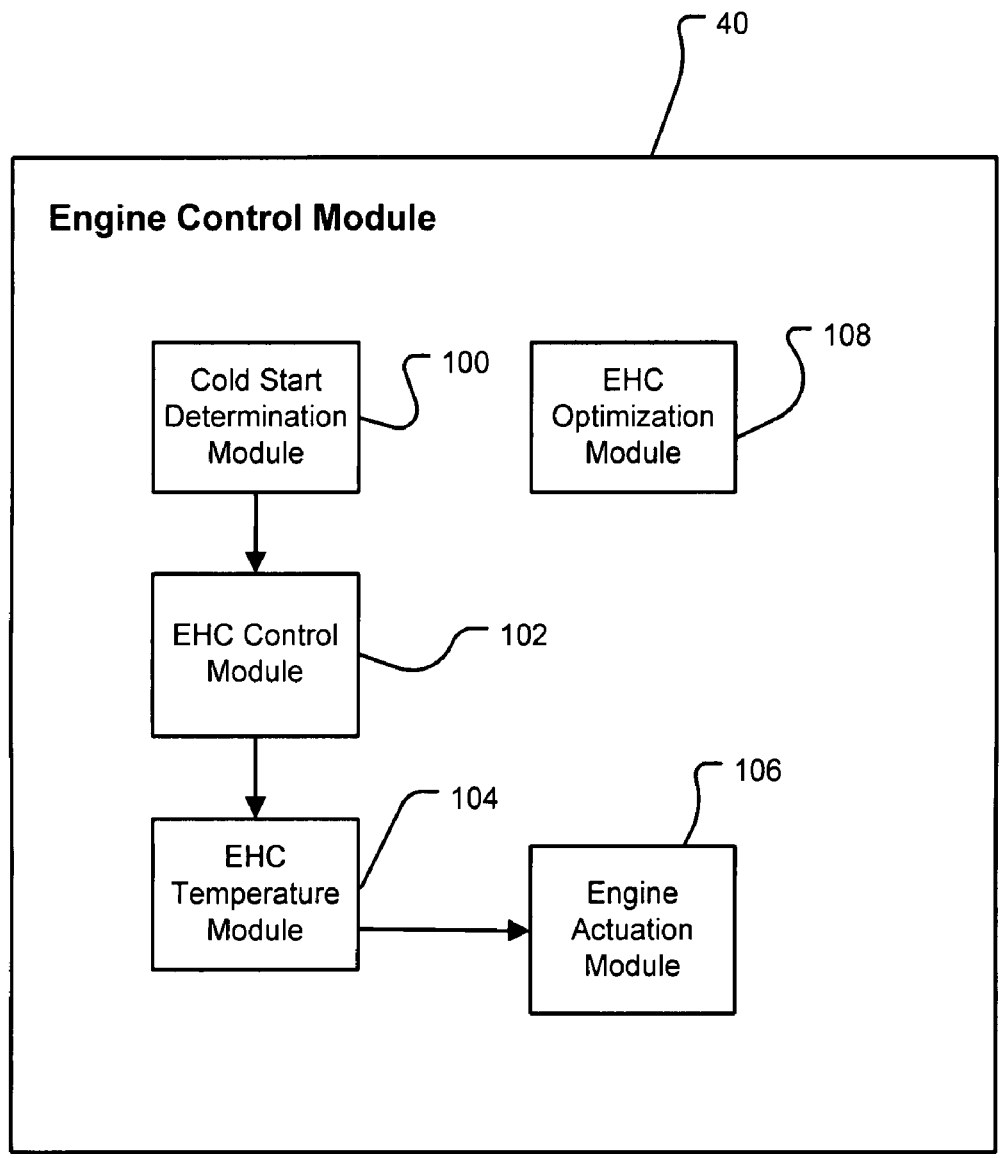
FIG. 3 is a diagram of the engine control module unit of FIGS. 1 and 2.

Referring now to FIG. 3, the engine control module 40 is illustrated in further detail. The engine control module 40 includes a cold start determination module 100, an EHC control module 102, an EHC temperature module 104, an engine actuation module 106, and an EHC optimization module 108. Cold start determination module 100 determines whether a cold start condition exists. In one example, cold start determination module 100 compares measured engine coolant temperature as provided by the output from temperature sensor 42 to a predetermined threshold. If the engine coolant temperature is below the threshold, a cold start condition exists. Cold start determination module 100 is in communication with EHC control module 102. If a cold start condition exists and other vehicle conditions do not override EHC energization, EHC control module 102 controls energization of EHC 32. EHC control module 102 is in communication with EHC temperature module 104. EHC temperature module 104 may be in receipt of a signal indicative of the temperature of EHC 32 via a sensor such as temperature sensor 54.

In the alternative, EHC temperature module 104 may estimate the temperature of EHC 32 by monitoring the time a magnitude of current and a magnitude of voltage are provided to EHC 32. Once EHC temperature module 104 determines that a predetermined temperature has been reached, communication is made with engine actuation module 106. Engine actuation module 106 starts engine 12. EHC control module 102 may continue to energize EHC 32 after engine 12 is started until it is determined that catalytic converter 30-3 will maintain a temperature sufficient to meet engine emissions standards. EHC optimization module 108 may retard spark ignition timing or alter the air-fuel ratio to minimize the time required to energize EHC 32.

Figure 4:
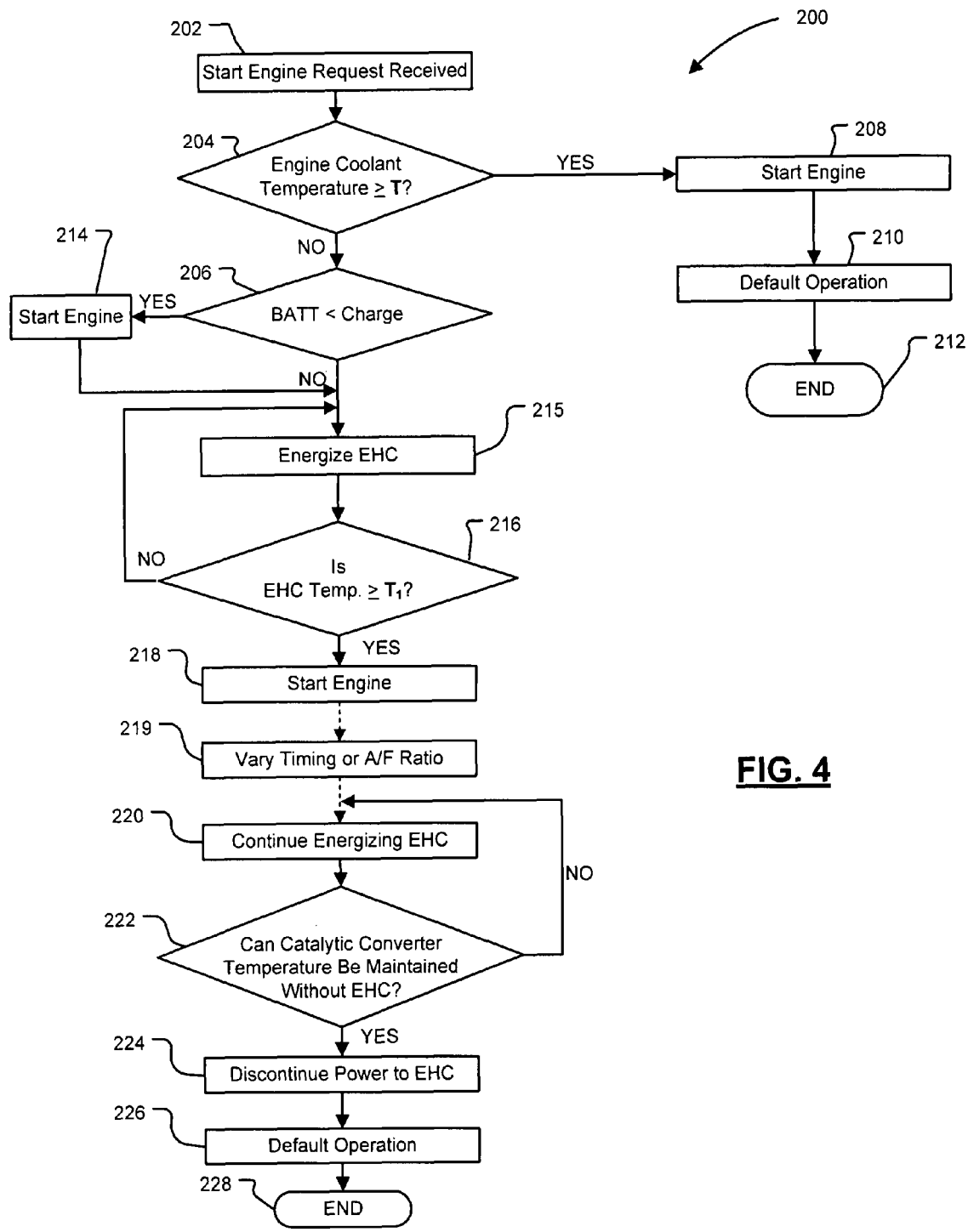
FIG. 4 is a flowchart illustrating steps of a method for providing electrically heated catalyst operation according to the present disclosure.

Referring now to FIG. 4, a flowchart depicts a method 200 for improving internal combustion engine emissions through use of an electrically heated catalyst. Method 200 may be implemented as a computer program that is stored in a computer memory associated with a computer. The computer and computer memory may be included in the engine control module 40.

In step 202, a start engine request is received. In step 204, control determines whether a cold start condition exists. When the engine coolant temperature is below a threshold value T, a cold-start condition exists and control continues to step 206 where the battery charge level is evaluated. If however, the engine coolant temperature is greater than or equal to T, the engine 12 may be started in step 208. Engine 12 operation is returned to default in step 210, and the method 200 is ended at step 212.

In step 206, the engine control module 40 determines whether the battery 24 charge has dropped below a predetermined level. If the battery 24 charge is below the predetermined level, the engine 12 is started in step 214. If the battery 24 charge is not below the predetermined level, control continues to step 215.

In step 215, the EHC 32 is energized and control continues to step 216.

In step 216, control determines whether the temperature of the EHC 32 is greater than or equal to a predetermined temperature, $T_1$. The predetermined value, $T_1$, may be associated with the light-off temperature where at least 50% of the exhaust gas products are consumed. Other temperature values may be used as well. If not, EHC 32 continues to be energized. If so, control proceeds to step 218.

In step 218, the engine 12 is started. After engine start, control continues to step 219. Step 219 is optional and relates to engine operation control to minimize the energization time of EHC 32. In particular, step 219 may retard the ignition timing to increase the exhaust gas temperature and reduce the amount of time that EHC 32 need be energized. Additionally, within step 219, the air-fuel ratio may be set to stoichiometry or to a value lean of stoichiometry to maximize the energy output by the oxidation and reduction reactions occurring within catalytic converter 30-3. The timing retardation may occur in concert with or separately from the air-fuel ratio modification and vice versa.

In step 220, EHC 32 continues to be energized. Control continues to step 222 where control determines whether catalytic converter 30-3 may be maintained above a desired temperature without EHC 32 being energized. If additional energy input is required, EHC 32 continues to be energized. If the system includes enough energy to maintain a desired temperature of catalytic converter 30-3, control continues to step 224 where power is discontinued to EHC 32. Control continues to step 226 where default engine operation is entered. Method 200 is ended at step 228.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. An engine control system comprising:
   a cold start determination module to determine whether an engine coolant temperature of a hybrid vehicle engine is less than a threshold value;
   an electrically heated catalyst (EHC) control module to selectively energize an electrically heated catalyst, the electrically heated catalyst including a heating element coated with a catalytic material and being positioned immediately upstream of a catalytic converter;
   an EHC temperature module to directly measure a temperature of said electrically heated catalyst; and
   an engine actuation module operable to selectively start said engine based on said engine coolant temperature and said electrically heated catalyst temperature, wherein said engine actuation module is operable to start said engine, independent of said electrically heated catalyst temperature, when at least one of an engine horsepower request exceeds a predetermined magnitude and a charge of a battery is less than a predetermined level,
   wherein said EHC control module energizes the electrically heated catalyst after said start of said engine independent of the charge of the battery at said start of said engine.

2. The engine control system of claim 1 wherein said engine actuation module starts said engine when said electrically heated catalyst temperature is above a predetermined temperature.

3. The engine control system of claim 1, wherein said EHC control module continues to energize said electrically heated catalyst until a target temperature of a catalytic converter positioned downstream of said electrically heated catalyst may be maintained without energization of said electrically heated catalyst.

4. The engine control system of claim 3, further including an EHC optimization module to set ignition timing after top-dead-center to increase an exhaust gas temperature and minimize a time required for said catalytic converter to reach said target temperature.

5. The engine control system of claim 3, further including an EHC optimization module to set an air-to-fuel ratio to one of stoichiometry and lean of said stoichiometry.

6. A method of operating an engine control system in a hybrid vehicle, the method comprising:
   generating an engine start signal;
   determining whether a cold start condition exists by determining whether an engine coolant temperature of a hybrid vehicle engine is less than a threshold value;
   determining an engine horsepower request;
   energizing an electrically heated catalyst including a heating element containing catalytic material based on said cold start condition;
   determining a temperature of said electrically heated catalyst;
   selectively starting said engine based on said engine start signal, said engine horsepower request and said electrically heated catalyst temperature, wherein said engine is started, independent of said electrically heated catalyst temperature, when at least one of said horsepower request exceeds a predetermined magnitude and a charge of a battery is less than a predetermined level; and
   energizing the electrically heated catalyst after said start of said engine independent of the charge of the battery at said start of said engine.

7. The method of claim 6 wherein energizing said electrically heated catalyst includes passing current through a heating element to increase the temperature of said electrically heated catalyst.

8. The method of claim 7 further comprising:
   starting said engine when said electrically heated catalyst temperature is above a predetermined temperature.

9. The method of claim 8 further comprising:
   continuing to energize said heating element after said engine starts and deactivating said electrically heated catalyst based on an estimation of the temperature of a catalytic converter positioned downstream of said electrically heated catalyst.

10. The method of claim 9 wherein said estimation of the catalytic converter temperature is based on at least one of an ambient air temperature, an engine flow, an engine coolant temperature and a spark ignition timing.

11. The method of claim 9 further comprising:
    setting ignition timing after top-dead-center to increase an exhaust gas temperature and minimize the time required for said catalytic converter to reach a predetermined temperature.

12. The method of claim 9 further comprising:
    setting an air-to-fuel ratio to one of stoichiometry and lean of said stoichiometry to minimize the time required for said catalytic converter to reach a predetermined temperature.

13. The method of claim 6 wherein said temperature of said electrically heated catalyst is measured directly.

14. The method of claim 6 wherein said temperature of said electrically heated catalyst is estimated.

15. The method of claim 14 wherein said temperature estimation of said electrically heated catalyst is based on the time a current and a voltage are supplied to said electrically heated catalyst.

16. An engine control system comprising:
    a cold start determination module to determine whether an engine coolant temperature of a hybrid vehicle engine is less than a threshold value;
    an electrically heated catalyst (EHC) control module to selectively energize an electrically heated catalyst including a heating element containing a catalytic material;
    an EHC temperature module to determine a temperature of said electrically heated catalyst; and
    an engine actuation module operable to selectively start said engine based on said engine coolant temperature and said electrically heated catalyst temperature, wherein said engine actuation module is operable to start said engine, independent of said electrically heated catalyst temperature, when at least one of an engine horsepower request exceeds a predetermined magnitude and a charge of a battery is less than a predetermined level, wherein said EHC control module estimates a time to continue energizing said electrically heated catalyst after said engine has started to maintain a minimum temperature of a catalytic converter positioned downstream of said electrically heated catalyst, energizes the electrically heated catalyst after said start of said engine independent of the charge of the battery at said start of said engine, and discontinues energization after said time estimate expires.

17. The system of claim 16, wherein said time estimate is based on at least one of an ambient air temperature, an engine coolant temperature, and an exhaust gas flow rate.

* * * * *